April 6, 1954  G. L. DENISTON  2,674,584
DEXTRAN UREA FORMALDEHYDE COMPOSITIONS
Filed Oct. 6, 1952
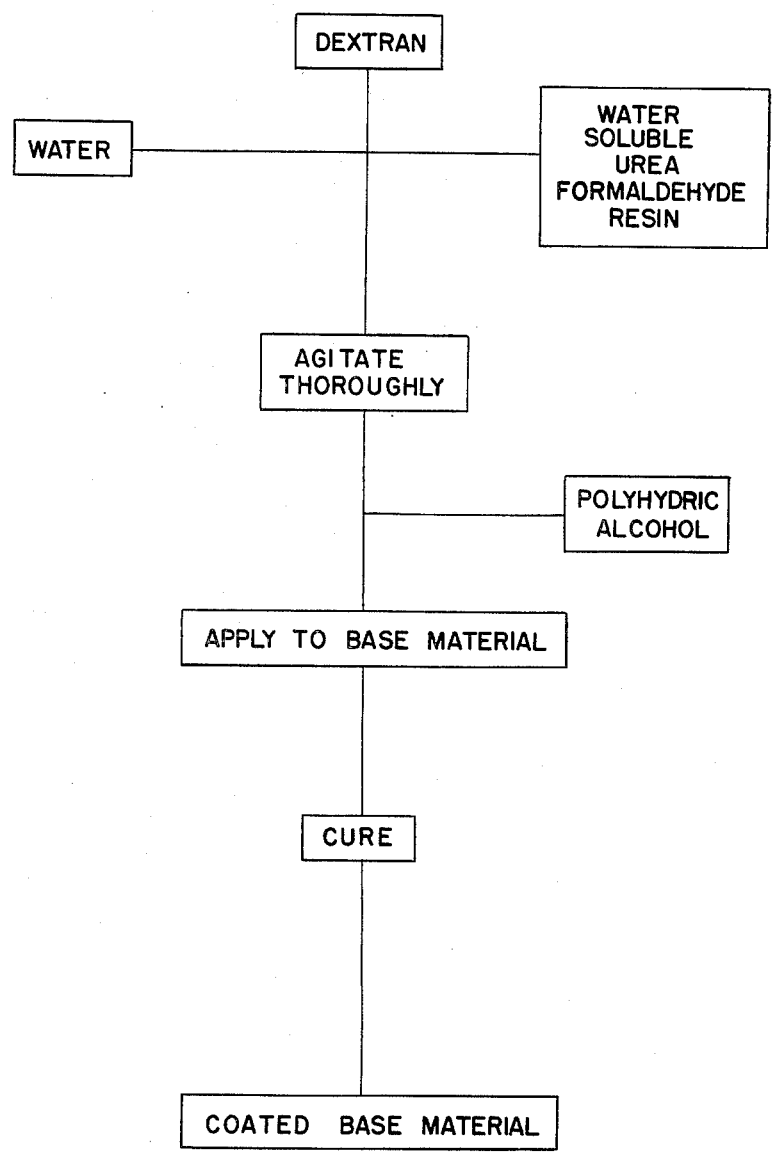
INVENTOR.
GEORGE L. DENISTON
BY
ATTORNEYS Patented Apr. 6, 1954

2,674,584

UNITED STATES PATENT OFFICE 2,674,584

DEXTRAN UREA FORMALDEHYDE COMPOSITIONS

George L. Deniston, Dayton, Ohio, assignor to The Commonwealth Engineering Company of Ohio, Dayton, Ohio, a corporation of Ohio Application October 6, 1952, Serial No. 313,346

19 Claims. (Cl. 260—17.3)

This invention relates to materials useful as coating compositions and to methods of producing the same; more particularly the invention relates to hard abrasion resistant coats useful on metal and other coating surfaces where acid resistance is a factor.

This application is related to copending application of Harry A. Toulmin, Jr., Serial No. 238,147, filed July 23, 1951, now Patent No. 2,624,768, and assigned to the same assignee as the present invention; and is further related to co-pending application of George L. Deniston, Serial No. 313,345, filed October 6, 1952, and assigned to the same assignee as the present invention.

It is an object of this invention to provide a new and novel coating composition which may be set in contact with the surface to be coated to provide a hard abrasion resistant surface.

Another object of this invention is to provide an efficient and economical process for the production of coated materials.

Thus the present invention contemplates in a preferred embodiment the employment of a high molecular weight water soluble polysaccharide, such as dextran, and an acid resistant resinous material. More particularly in the process of invention the water soluble dextran is mixed in an aqueous solution with water soluble urea formaldehyde. The viscous mass thus formed is applied to the surface to be coated, and then cured. Upon application of heat to effect the cure the product assumes a rigid character and sets to a hard non-oxidizable coat of acid resistant qualities.

The product attained by this invention is particularly suitable with weak organic acids such as acetic and may be usefully employed as a liner for cartons containing stewed fruits, etc. With stronger acids such as the mineral acids in high concentration some pitting of the product may take place at high temperatures or on long periods of exposure. In many instances this pitting will not be harmful however.

The dextran referred to is a polysaccharide produced by the action of microorganisms on a suitable culture medium, and may be prepared by forming a mixture containing sucrose that is in the form of crude sugar, molasses or the like, together with nitrogen in the form of commercial peptone, beef extract or other similar material, and salts such as di-potassium phosphate and sodium chloride is inoculated with *Leuconostoc mesenteroides* or *Leuconostoc dextranicum*. A typical medium may contain 5 to 10% of sucrose, 0.1% of peptone, 0.2% of dipotassium phosphate and 0.1% of sodium chloride. The pH of the medium is adjusted preferably slightly on the alkaline side of neutrality.

The inoculated culture may be incubated at a temperature most favorable to the growth of the micro-organism being used. For *L. mesenteroides* a temperature of about 25° C. is suitable. When the fermentation has been completed the polysaccharide formed is precipitated from the culture by the addition thereto of alcohol or acetone. The precipitate may be purified by further washing with alcohol or acetone.

The dextran thus produced may be redissolved and hydrolyzed with acid and the solution fractionated by treatment with isopropyl alcohol to remove the high molecular constituents, leaving a dextran having a molecular weight in the range of 60,000 to 400,000, which is the desired range for the material utilized in the practice of this invention.

Urea formaldehyde is particularly suitable for the practice of the invention as the urea and formaldehyde under neutral or even slightly alkaline conditions react at mild temperatures to form the "A" stage intermediates to result in water soluble monomethylol or dimethylol urea. Under mildly acid conditions or with the addition in suitable instances of for example a salt such as $NH_4Cl$ the "B" stage resin may be formed and finally with application of heat the "C" stage resin a hard infusible product may be obtained. Presently urea formaldehyde intermediates which are soluble in water and which form a hard insoluble product when heated in the presence of a small amount of water are commercially available and the invention will be described with particular reference thereto.

Glycols where desired may be incorporated into the mix to effect a softening or plasticizing action which has a particular benefit where the coating material is to be applied by spray methods. The glycols may include ethylene glycol, diethylene glycol, triethylene glycol and propylene glycol, all of which have a high affinity for water and a degree of solvent action for dextran.

The method of invention is practiced by first adding an excess of dextran to water and thoroughly mixing the same to form a fibrous mass. The urea formaldehyde resin having a concentration of solids of between about 40 and 80% in an aqueous solution is then added to the polysaccharide mass, and the same is thoroughly agitated to insure complete mixing of the ingredients. Thereafter a small amount of the glycol may be added and the same completely mixed into the polysaccharide resin material. It should be noted that it is preferable to add the glycol in the final step in order that the same may be thoroughly mixed with both the dextran and the resin base components.

The completely mixed aqueous mass may then be applied to the surface to be protected either by means of a spray gun, brush or other suitable applicator. The choice of applicator may in some instances be restricted by the viscosity of the aqueous mass which increases with the dextran content, and water may be suitably added to very viscous materials to render them applicable by selected means.

After application to the surface to be protected the surface and coating are baked at between about 150° F. to 250° F. to evolve water and set the resin to a hard abrasion resistant layer. Where glycols are employed it is preferable to maintain the temperature low in order to secure a greater degree of flexibility in the product.

It should also be noted that the composition may be applied to any surface which will itself withstand the temperatures of baking.

The invention will be more fully understood by reference to the following descriptive examples and to the accompanying flow sheet:

*Example I*

Dextran composition: Per cent by weight
 Dextran (average molecular weight of 75,000 relative viscosity 3.28) -------- 13
 Water --------------------------------- 87

Resin composition: Per cent by weight
 Water soluble urea formaldehyde ---- 50
 Water --------------------------------- 49.8
 $NH_4Cl$ ------------------------------ 0.2

The resin and dextran compositions set forth above when mixed in equal parts by weight are treated as described hereinbefore, that is, thorough mixing is occasioned in any suitable manner and the material sprayed onto a metal, whereafter the combination is heated to produce a hard coating mixture.

*Example II*

Dextran composition: Per cent by weight
 Dextran (average molecular weight of 70,000) ------------------------------- 85
 Water --------------------------------- 15

Resin composition: Per cent by weight
 Water soluble urea formaldehyde ---- 65
 Water --------------------------------- 34.5
 $NH_4Cl$ ------------------------------ 0.5

In this example the dextran and resin compositions are mixed in equal parts by weight, the predominance of the dextran results in a very viscous condition necessitating a somewhat longer time of mixing for complete incorporation of the ingredients. However, lesser water is present in this mix than upon application with a brush or roll coat, the time of curing is somewhat less than is required for the composition of Example I since less water is required to be evaporated.

*Example III*

Dextran composition: Per cent by weight
 Dextran (average molecular weight of 75,000) ------------------------------- 50
 Water --------------------------------- 50

Resin composition: Per cent by weight
 Water soluble urea formaldehyde ------ 60
 Water --------------------------------- 39.6
 $NH_4Cl$ ------------------------------ 0.4

The composition formed by mixing the above components, since the same has less of the viscosity causing dextran therein, will flow more readily than the composition of Example II when the components are present in equal parts by weight. Accordingly the spray application is facilitated in this instance by the incorporation into the thoroughly mixed material of approximately 3% by weight of ethylene glycol. The product is then sprayed and cured as noted hereinbefore.

It will be appreciated that the foregoing process may be adapted to continuous methods for the production of coatings on metals, fabrics and paper which will withstand the curing temperature involved.

While the precise nature of the action involved between the polysaccharide dextran and the resinous material is not completely understood, it is believed that an additional reaction may occur which permits the formation of the product of invention.

The temperature range of 150° F. to 250° F. is to be understood as the preferred range for the practice of this invention since curing and water will take place satisfactorily under these conditions; however where more rapid evolution of the water is desired, and where a fast cure is suitable temperatures of up to 400° F. may be suitably employed. However as noted hereinbefore the lower temperatures are preferable where flexibility in the product is a factor.

It will be understood that while there have been given herein certain specific examples of the practice of this invention, it is not intended thereby to have this invention limited to or circumscribed by the specific details of materials, proportions or conditions herein specified, in view of the fact that this invention may be modified in accordance with individual preference or conditions without necessarily departing from the spirit of this disclosure and the scope of the appended claims.

I claim:
1. The process of providing a base material with a coating having qualities of acid resistance which process includes the steps of forming an aqueous plastic mass comprising dextran and a water-soluble urea-formaldehyde resin, applying the mass to said base material, and heating the mass in contact with the base to eliminate the water therefrom and set the composition.

2. The process of providing a base material with a coating having qualities of acid resistance which process includes the steps of forming an aqueous plastic mass comprising dextran and a water soluble urea formaldehyde resin, applying the mass to said base material, and heating the mass in contact with the base to a temperature in the range of 150° F. to 250° F. to eliminate the water therefrom and set the composition.

3. The process of providing a base material with a coating having qualities of acid resistance which process includes the steps of forming an aqueous plastic mass comprising dextran, ammonium chloride and a water soluble urea formaldehyde resin, applying the same to said base material, and heating the same to a temperature in the range of 150° F. to 250° F. to eliminate water therefrom and set the composition.

4. The process of providing a base material with a coating having qualities of acid resistance which process includes the steps of forming an aqueous plastic mass comprising dextran and a water-soluble urea formaldehyde resin, applying the mass to said base material, and heating the mass in contact with the base to a temperature in the range of 250° F. to 400° F. to eliminate water therefrom and set the composition.

5. The process of providing a base material with a coating having qualities of acid resistance which process includes the steps of forming an aqueous plastic mass comprising dextran, a water soluble urea formaldehyde resin and a water miscible glycol, applying the same to said base material, and heating the same to a temperature in the range of 150° F. to 250° F. to eliminate water therefrom and set the composition.

6. The process of providing a base material with a coating having qualities of acid resistance which process includes the steps of forming an aqueous plastic mass comprising dextran, a water soluble urea formaldehyde resin and ethylene glycol, applying the same to said base material, and heating the same to a temperature in the range of 150° F. to 250° F. to eliminate water therefrom and set the composition.

7. The process of providing a base material with a coating having qualities of acid resistance which process includes the steps of forming an aqueous plastic mass comprising dextran, a water soluble urea formaldehyde resin and diethylene glycol, applying the same to said base material, and heating the same to a temperature in the range of 150° F. to 250° F. to eliminate water therefrom and set the composition.

8. The process of providing a base material with a coating having qualities of acid resistance which process includes the steps of forming an aqueous plastic mass comprising dextran, a water soluble urea formaldehyde resin and tri-ethylene glycol, applying the same to said base material, and heating the same to a temperature in the range of 150° F. to 250° F. to eliminate water therefrom and set the composition.

9. The process of providing a base material with a coating having qualities of acid resistance which process includes the steps of forming an aqueous plastic mass comprising dextran, a water soluble urea formaldehyde resin and propylene glycol, applying the same to said base material, and heating the same to a temperature in the range of 150° F. to 250° F. to eliminate water therefrom and set the composition.

10. A composition for coating base materials to improve the acid resistant qualities thereof which composition comprises as an aqueous plastic mass dextran and a water soluble urea formaldehyde resin capable of heat polymerization.

11. A composition for coating base materials to improve the acid resistant qualities thereof which composition comprises as an aqueous plastic mass dextran, a water soluble urea formaldehyde resin capable of heat polymerization and a water miscible glycol.

12. A composition for coating base materials to improve the acid resistant qualities thereof which composition comprises as an aqueous plastic mass dextran, a water soluble urea formaldehyde resin capable of heat polymerization and ethylene glycol.

13. A composition for coating base materials to improve the acid resistant qualities thereof which composition comprises as an aqueous plastic mass dextran, a water soluble urea formaldehyde resin capable of heat polymerization and diethylene glycol.

14. A composition for coating base materials to improve the acid resistant qualities thereof which composition comprises as an aqueous plastic mass dextran, a water soluble urea formaldehyde resin capable of heat polymerization and tri-ethylene glycol.

15. A composition for coating base materials to improve the acid resistant qualities thereof which composition comprises as an aqueous plastic mass dextran, a water soluble urea formaldehyde resin capable of heat polymerization and propylene glycol.

16. In the process of forming a coating composition the step of introducing a water miscible glycol to an aqueous plastic mass comprising dextran and a water soluble urea formaldehyde resin capable of heat polymerization, whereby a degree of flexibility is induced in the product upon polymerization.

17. In the process of forming a coating composition the step of introducing ethylene glycol to an aqueous plastic mass comprising dextran and a water soluble urea formaldehyde resin capable of heat polymerization, whereby a degree of flexibility is induced in the product upon polymerization.

18. In the process of forming a coating composition the step of introducing di-ethylene glycol to an aqueous plastic mass comprising dextran and a water soluble urea formaldehyde resin capable of heat polymerization, whereby a degree of flexibility is induced in the product upon polymerization.

19. In the process of forming a coating composition the step of introducing propylene glycol to an aqueous plastic mass comprising dextran and a water soluble urea formaldehyde resin capable of heat polymerization, whereby a degree of flexibility is induced in the product upon polymerization.

References Cited in the file of this patent
UNITED STATES PATENTS

| Number | Name | Date |
| --- | --- | --- |
| 2,624,768 | Toulmin | Jan. 6, 1953 |

OTHER REFERENCES

Kienle, Ind. and Eng. Chem., vol. 21, pages 349–352, April, 1929.